March 30, 1965  A. F. BERTHIER  3,175,782
REEL WITH RESILIENT DRIVING MEANS
Filed Nov. 1, 1963  2 Sheets-Sheet 1

INVENTOR
Albert Fernand Berthier
BY Emory L. Groff Jr.
ATTORNEY

United States Patent Office

3,175,782
Patented Mar. 30, 1965

3,175,782
REEL WITH RESILIENT DRIVING MEANS
Albert Fernand Berthier, Thonon-les-Bains,
Haute-Savoie, France
Filed Nov. 1, 1963, Ser. No. 321,217
Claims priority, application France, Aug. 9, 1960, 835,875
6 Claims. (Cl. 242—84.3)

This application is a continuation-in-part of my co-pending application Serial No. 127,924, filed July 31, 1961, and now abandoned.

This invention relates to an automatic mechanical winch comprising a device designed to take into account incidental variations in the load supported by the load bearing line or cable, the unwinding of the cable being braked and balanced automatically relative to the load which causes the unwinding thereof.

The accompanying drawings show by way of example one embodiment of the winch of the invention employed as a fishing reel.

Figure 4:
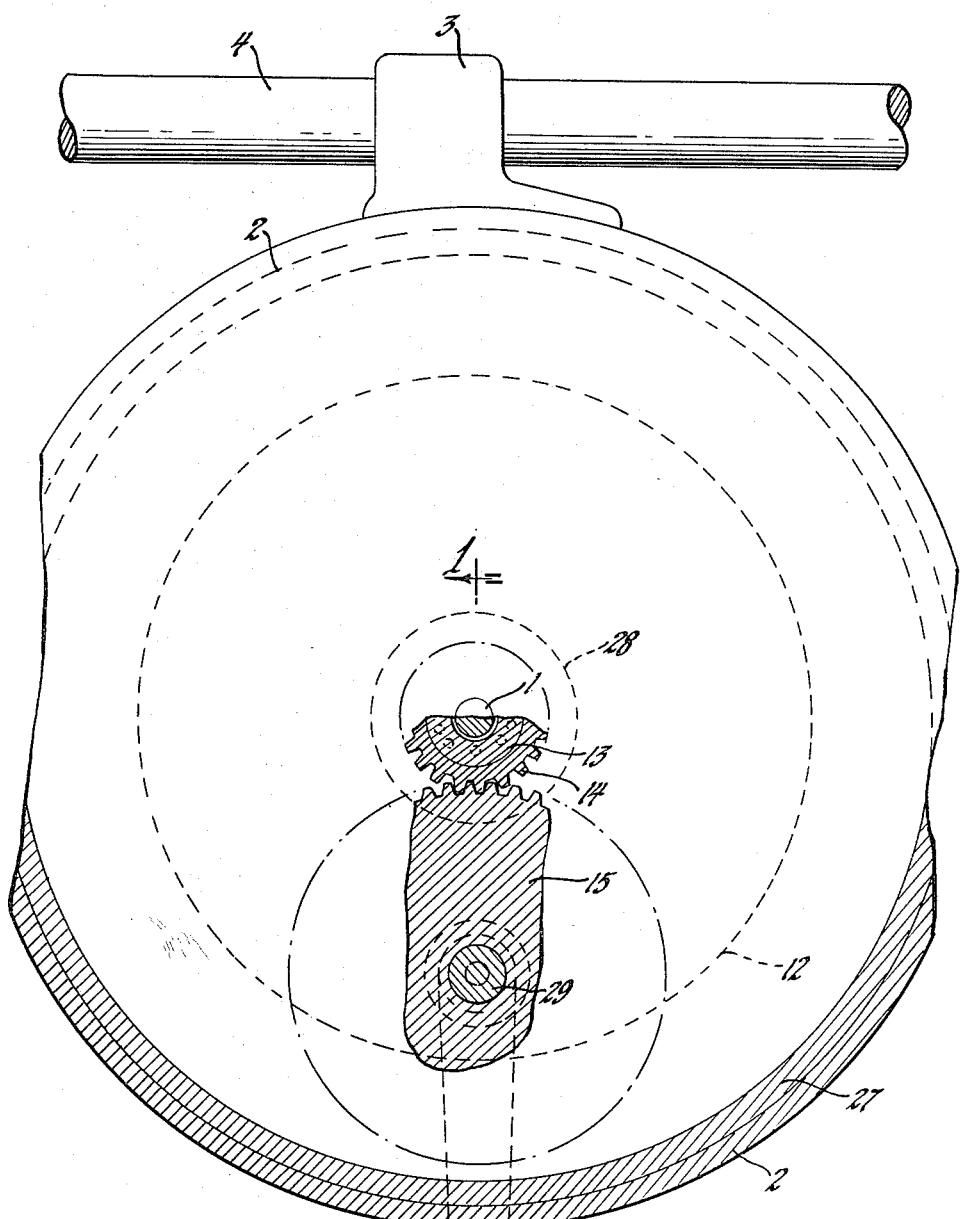
FIGURE 4 is a fragmentary side elevation of the winch, partly in section, along the line IV—IV of FIGURE 1.

The winch, in the embodiment shown, comprises a central axle 1, or primary shaft, secured at one of its ends in the side wall of a casing 2 of cylindrical shape, the said casing being provided, at its upper end, with a support 3 designed for attachment to a fishing rod 4 shown partially in FIGURE 4.

The axle 1 is disposed within a hollow axle 5, or secondary shaft, designed to be rotated in the line winding direction indicated by arrow $f$ in FIG. 4 on the axle 1 by means hereinafter described. Appreciable reverse rotation of shaft 5 relative to the stationary central axle 1 is prevented by ratchet 6. To accomplish this, the inner collar 7 of the ratchet 6 is integral with the hollow axle 5, the outer collar 8 of the said ratchet being fixed by means of a tapped web to the central axle 1. The purpose of the ratchet means 6, 7, 8 is to ensure that the sleeve or axle 5 will rotate on the axle 1 only in line winding direction.

Figure 1:
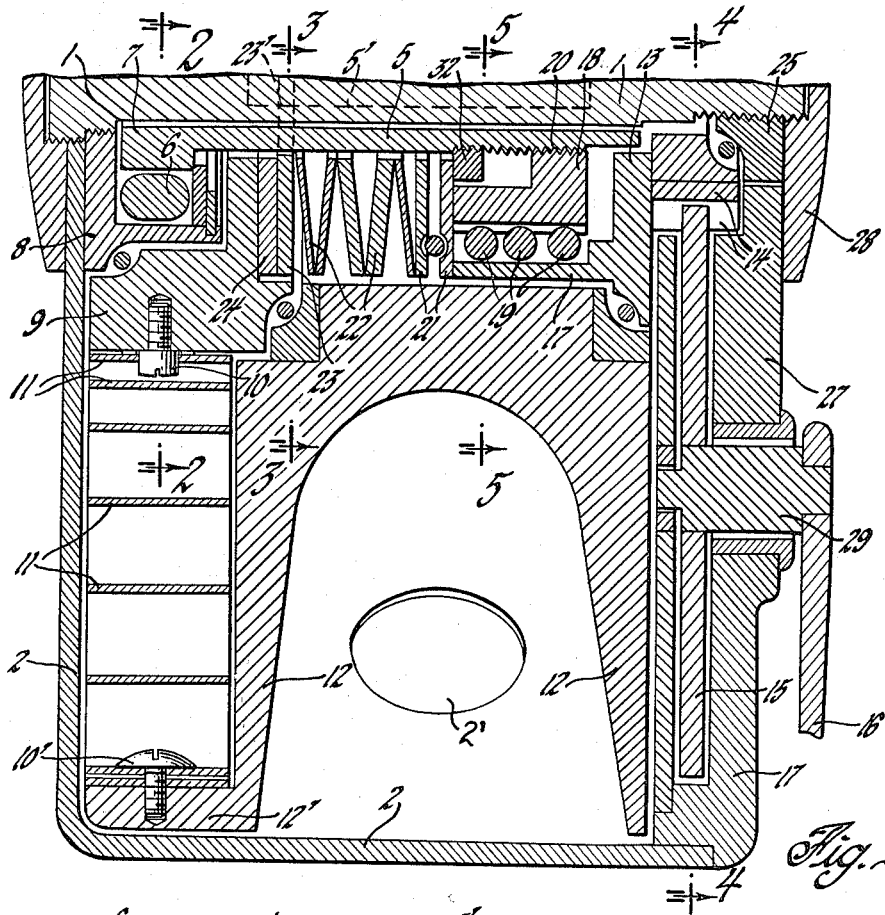
FIGURE 1 is a vertical sectional view of the lower half of the winch, taken on the line I—I of FIGURE 4.

The outer collar 8 is engaged in a hollow element 9, or ternary shaft, capable of rotating on the axle 1 by means of said collar. The element 9 is provided with a recess for the reception of the thrust of a washer braking device, described hereafter, and with a spring blade driving device comprising a screw 10 having a hook-like head secured to the periphery of the element 9 and forming catch means for the elongated opening 11′ in the end of a coiled spring 11, the other end of which is fixed at 10′ (FIGURE 1) to the side flange 12 of a cable winding drum 12.

At the opposite end to where it is attached to the casing 2, the axle 1 is disposed in a sleeve 13 connected for rotation with pinion 14 adapted to be rotated by a speed step-up gear 15 driven by a handle 16. The sleeve 13 includes a barrel 17 for driving a threaded brake nut 18 capable of rotating and moving on the axle 5 in a direction parallel to the axle 1 inside the barrel 17 by means of a bearing member comprising a plurality of balls 19.

Figures 2, 3, 5:
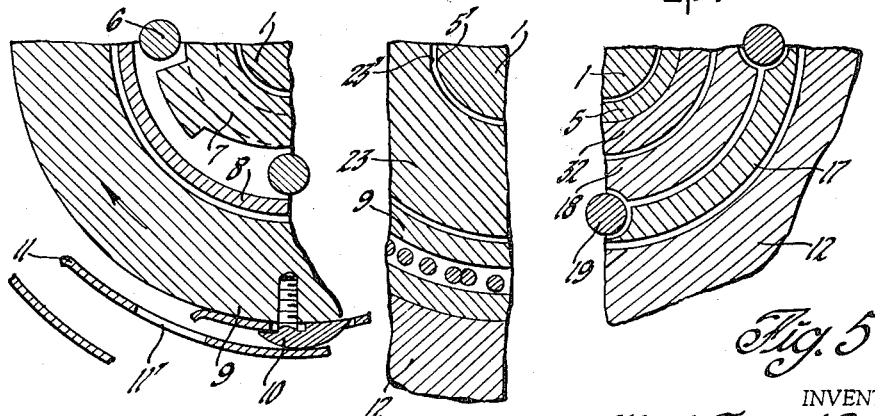
FIGURE 2 is a partial cross section, along the line II—II of FIGURE 1.
FIGURE 3 is a partial cross section, along the line III—III of FIGURE 1.
FIGURE 5 is a partial cross section along the line V—V of FIGURE 1.

A washer braking device, designed to absorb the thrust of the nut 18 through the means of a ball thrust bearing 21, includes juxtaposed washers 22 forming a spring, the end washer being in contact with a friction member comprising a cast steel washer 23 having its center opening formed with a flat part 23′ (FIG. 3) keyed for slidable rotation by means of a flat side 5′ (FIG. 3) on the axle 5 and able to slide on the said axle, and a fiber washer 24, accommodated in the cup of the axle 9. The purpose of the flat parts 5′ and 23′ on axle 5 and washer 23, respectively, is to permit longitudinal sliding of washer 23 on axle 5 while preventing relative rotation between axle 5 and the washer.

The number, the power, and the arrangement of the washers 22 forming a spring are determined so that the limiting total braking power of the winch corresponds to the acceptable limiting breaking load of the cable.

A nut 25, one face of which is provided with an inner cup for the rolling of a ring of balls, the outer cup of which is formed by the axle 13, is engaged in a suitable position on the axle 1. This nut 25 is designed to ensure the control of the elements of the axle of the winch.

The cable winding drum 12 is capable of rotating in the two directions by means of ball bearings disposed at each of the ends of its central recess. Near to the bottom of the casing 2, the said drum rotates on the ternary shaft 9, and, near the handle 16, rotates on the primary shaft 1 by means of the rolling cone of the nut 25 and of the axle 13. The drum 12 is driven in the direction of the winding of the cable, shown by the arrow $f$ (FIG. 4), under the action of the absorption spring 11 and by the rotation of the spindle 9. In the direction of unwinding of the cable, the said drum is driven under the action of the traction of the cable itself braked by the resistance due to the drive of the load taking into account the friction in the medium in which it is to be found.

The casing 2, enclosing the entire mechanism of the winch and of the winding drum, is closed by a cover 27 fixed by means of a nut 28 on the end threads of the central axle 1. The cover 27 is provided with an opening designed for the passage of an axle 29 common to the wheel 15 and to the handle 16.

The load at the free end of the cable being variable, it is necessary that the braking force of the winch be less at the breaking limit of the said cable. For this reason, a collar 32, calibrated and tapped, engages with the threaded end of the axle 5, the said collar being designed to balance the braking power with the holding force of the load bearing cable, so as to avoid the rupture of the said cable under the effect of the traction due to the load. Furthermore, the collar 32 is designed to prevent an exaggerated flattening of the brake washers 22 under the effect of the movement of the nut 18, which would result in blocking the mechanism and occasioning the rupture of the cable.

The said collar 32 has a thickness such that it limits, according to the necessities of mounting it and the use to which it is desired to make of the apparatus, the length of the track of the nut 18 on the hollow axle 5. The nut 18 controls the braking and the coupling effected by means of: the ball thrust bearing 21, the spring 22, the supporting washer 23–23′, the friction washer 24 and the bowl of the washer 9.

The drawing shows the apparatus as a whole, all its elements being in a slackened state, and the coupling brake at rest.

The use of the winch thus constructed permits control by the operator of the winding or unwinding of the cable, which is automatically established by means of the operation of the handle 16 which actuates the mechanical assembly 29–15–14–13–17–19–18–21–22–23–24–9–11 and 12 to which is fixed the load bearing cable, between the force M applied by the operator to the handle 16, and the traction of the load P applied to the cable wound around the reel or drum 12.

If $M<P$, the unit 23-24-9 operates as a brake, and the load P unwinds the bearing cable under the control of the operator.

If $M>P$, the unit 23-24-9 operates as a coupling, and the load P is brought towards the operator by the bearing cable which winds around the reel or drum 12.

The cylindrical casing 2 is provided on its periphery with openings 2' (FIG. 1) one of which is traversed by the load bearing cable, others being designed for ventilation.

The winch described operates automatically under the action of the load on the cable and of the operation of the handle 16 which is assured, either by hand, or by means of a low power motor mounted on the axle 29.

The axle for driving the winch, either by the handle, or by a motor, is designed to rotate freely in the direction of the winding of the load bearing cable. In the direction of unwinding of the cable, the rotation of this shaft is restricted to the releasing of the washer brake.

I claim:

1. In an automatic mechanical winch having a casing including a rear wall, a continuous side wall and a removable cover, a line receiving drum rotatably mounted within said casing, a crank mounted in said cover, a first shaft fixed at one end to the rear wall of said casing and fixed at its other end to said cover, a hollow second shaft surrounding said first shaft intermediate its fixed ends, ratchet means adjacent the rear wall of the casing and having elements respectively secured to said first and second shafts, means for driving said drum in a winding direction comprising, a first sleeve surrounding said ratchet means and secured thereto, a tension spring wound around said first sleeve, a hook secured to the periphery of said first sleeve and retaining the inner end of said tension spring, the outer end of said spring secured to said drum, a second sleeve adjacent the cover and rotatable around said first and second shafts, a pinion secured to said second sleeve, a gear wheel fixed to said crank and in engagement with said pinion to rotate said second sleeve upon rotation of said crank, said first and second sleeves providing the bearing surface upon which said drum is rotatably supported, braking means surrounding the central portion of said second shaft for restraining the unwinding of said drum, said braking means confined between said first and second sleeves, and means carried by said second sleeve for engaging and releasing said braking means in response to the direction of rotation of said crank.

2. An automatic mechanical winch according to claim 1, wherein said ratchet means comprises a cage including spaced inner and outer collars, said inner collar secured to said second shaft, said outer collar having a flange at one end provided with a central threaded bore for attachment of said outer collar to the end of said first shaft adjacent the rear wall of the cover, and rollers confined in the space between said inner and outer collars.

3. An automatic mechanical winch according to claim 1, wherein said braking means includes a pair of first washers having ball bearings interposed therebetween, one of said washers abutting the inner edge of said second sleeve, a second washer having a high coefficient of friction and in abutting relationship to the inner surface of said first sleeve, a third washer in abutting relationship to said second washer and having a flat portion in its central opening to prevent it from rotating on said second shaft, and juxtaposed spring washers confined between the other of said first washers and said third washer.

4. An automatic mechanical winch according to claim 3, wherein the means for engaging and releasing said braking means includes a nut housed within said second sleeve and rotatable on said second shaft when said second sleeve is rotated by means of said handle, the movement of said nut in one direction forcing said second washer into frictional engagement with said first sleeve, the movement thereof in the opposite direction releasing said second washer thereby permitting free rotation of said first sleeve.

5. An automatic mechanical winch according to claim 4, including a tapped collar threadedly engaging said second shaft in the path of travel of said nut toward said first washers to balance the braking power relative to the holding force of the cable to thereby prevent rupture of the cable and exaggerated flattening of the spring washers under pressure of said nut.

6. An automatic mechanical winch according to claim 1, wherein said spring is coiled in the direction to bias the drum in the rewind direction when said crank is operated to keep the line taut.

References Cited by the Examiner

UNITED STATES PATENTS

| | | | |
|---|---|---|---|
| 2,463,108 | 3/49 | Jacobson | 242—84.3 |
| 2,587,308 | 2/52 | Gilette | 242—84.3 X |
| 2,672,217 | 3/54 | Sarah | 242—84.3 X |
| 2,910,252 | 10/59 | Joy | 242—84.3 |

RUSSELL C. MADER, *Primary Examiner.*

MERVIN STEIN, *Examiner.*